United States Patent [19]
Hafner

[11] 4,422,337
[45] Dec. 27, 1983

[54] METHOD OF COMPENSATING THE INTERFERENCE DC VOLTAGES IN THE ELECTRODE CIRCUIT IN MAGNETIC-CONDUCTIVE FLOW MEASUREMENT

[75] Inventor: Peter Hafner, Therwil, Switzerland
[73] Assignee: Flowtec AG, Reinach, Switzerland
[21] Appl. No.: 304,169
[22] Filed: Sep. 21, 1981

Related U.S. Application Data

[63] Continuation-in-part of Ser. No. 254,634, Apr. 16, 1981, Pat. No. 4,382,387.

[30] Foreign Application Priority Data

Oct. 2, 1980 [DE] Fed. Rep. of Germany ....... 3037283
Aug. 17, 1981 [DE] Fed. Rep. of Germany ....... 3132471

[51] Int. Cl.$^3$ .................................................. G01F 1/60
[52] U.S. Cl. ................................................... 73/861.17
[58] Field of Search ....................................... 73/861.17

[56] References Cited

U.S. PATENT DOCUMENTS 4,010,644  3/1977  Bonfig et al. ..................... 73/861.17
4,210,022  7/1980  Boss ................................. 73/861.17

*Primary Examiner*—Charles A. Ruehl
*Attorney, Agent, or Firm*—Gerald J. Ferguson, Jr.; Joseph J. Baker

[57] ABSTRACT

An arrangement for magnetic-inductive flow measurement of an electrically conductive liquid flowing in a conduit includes a magnetic field generator which generates a periodically reversed magnetic field passing through the conduit perpendicularly to the flow direction. In the conduit two electrodes are disposed. The voltage taken from the electrodes is applied to a measuring amplifier. Connected to the output of the measuring amplifier are two sample and hold circuits which are controlled by a control circuit in such a manner that they sample the output voltage of the measuring amplifier for equal induction values of opposite sign of the magnetic field and store the sampling values until the next sampling. A subtraction circuit forms the difference of the stored sampling values. In a control loop between the output and the input of the measuring amplifier there is a storing control circuit which in predetermined compensation time intervals forms a compensation voltage value regulating the output voltage of the measuring amplifier to zero. The compensation method resides in that each compensation time interval lies within the time interval, corresponding to the switched-on magnetic field, in which also the preceding sampling time interval lies.

6 Claims, 6 Drawing Figures

METHOD OF COMPENSATING THE INTERFERENCE DC VOLTAGES IN THE ELECTRODE CIRCUIT IN MAGNETIC-CONDUCTIVE FLOW MEASUREMENT

CROSS-REFERENCE TO RELATED APPLICATION

This application is a continuation-in-part of U.S. application Ser. No. 254,634, filed Apr. 16, 1981, now U.S. Pat. No. 4,382,387.

BACKGROUND AND SUMMARY OF THE INVENTION

The invention relates to a method of compensating the interference DC voltages in the electrode circuit in magnetic-conductive flow measurement with periodically reversed DC magnetic field in which the useful signal is obtained by sampling and storing the signal voltage after each reversal of the magnetic field at opposite polarity values of said magnetic field during a sampling time interval and forming the difference of the stored sampled values and wherein in a compensating time interval following each sampling time interval a compensation voltage is produced by sampling and storing the signal voltage, which compensation voltage is superimposed oppositely on the signal voltage for compensating the signal voltage within the compensation time interval to the value zero and is retained until the next compensation time interval, and to an arrangement for carrying out the method.

A method of this type is known from U.S. Pat. No. 4,210,022. The difference of the sampling values obtained with opposite polarity values of the magnetic field gives a useful signal which is freed from constant interference DC voltages which as is known in the magnetic-inductive flow measurement can be as much as a thousand times greater than the useful signal. By the formation and superimposing of an additional compensation voltage linear time variations of the interference DC voltages between the successive sampling time intervals are also compensated and above all the amplifiers and subtraction circuits used to process the signal voltage are prevented from being overdriven due to the interference DC voltages building up slowly to a very high value.

In this known method each compensation time interval lies in a pause in the magnetic field which is inserted in each case between two successive partial periods in which the magnetic field assumes its oppositely poled value. The signal voltage sampled to form the compensation voltage is thus the pure interference voltage. The magnetic field must therefore be periodically switched between three values such that the pauses in the magnetic field and the compensation time intervals contained therein cannot be utilized for observing the flow.

In similar manner, in a method known from U.S. Pat. No. 4,010,644 a compensation of time variations of the interference DC voltages is carried out by forming a compensation voltage which is oppositely superimposed on the signal voltage. In this known method the magnetic field is switched to and fro between two different values, one of which may be zero. In this case in each partial period in which the magnetic field has the smaller value (or the value zero) two compensation time intervals lie at the start and the end of the partial period respectively, and between said two compensation time intervals there is a sampling time interval in which only the interference DC voltage change which has taken place since the last compensation is sampled and stored. On the other hand, in the other partial period no compensation takes place but only a sampling and storing of the compensated signal voltage which is equal to the sum of the useful signal and interference DC voltage change. This method is asymmetrical in time and the stored sampling values whose difference is formed have different orders of magnitude.

The problem underlying the invention is the provision of a method of compensating interference DC voltages in the magnetic-conductive flow measurement which permits the maximum possible utililzation of the available time for observing the flow and gives a large useful signal with respect to the power expenditure; the stored sample values subjected to the difference formation being of the same order of magnitude.

According to the invention this is achieved in that each compensation time interval lies within the time interval, corresponding to the switched-on magnetic field, in which also the preceding sampling time interval lies.

With the method according to the invention in completely regular manner in each partial period corresponding to the one or the other value of the magnetic field firstly a sampling and storing of the compensated signal voltage takes place and thereafter a compensation of the signal voltage to the value zero. Thus, the compensation voltage also includes the useful signal at the compensation instant. Since this compensation voltage in the sampling time interval of the following partial period remains superimposed on the signal voltage then obtaining, in each sampling time interval to form the stored sampling value a voltage is sampled which contains the sum of the useful signals in a compensation time interval and in the following sampling time interval. In this manner the compensation time interval is also used for obtaining the measured value signal and observing the flow. The stored sampling values whose difference is formed are of the same order of magnitude. This method is particularly suitable when the magnetic field is switched to and fro without pauses between two oppositely poled values so that no magnetic field intervals are lost for the observation of the flow.

An advantageous further development of the method of the invention resides in that at the start of each sampling time interval for a short time an instantaneous value sampling and storing of the signal voltage takes place without integration and the sampled signal voltage is applied to an integrating storage member only in the remaining part of the sampling time interval.

This further development substantially shortens the response time so that even very rapid flow changes are immediately detected and indicated.

A particular advantage of the method according to the invention resides in that by the nature of the signal formation the influence of an interference AC voltage superimposed on the useful signal can also be obviated without a defined relationship having to exist between the duration of the sampling time interval and the period of the interference AC voltage.

A preferred arrangement for carrying out this further development of the method for the inductive flow measurement of an electrically conductive liquid flowing in a conduit, comprising a magnetic field generator which generates a periodically reversed magnetic field passing through the conduit perpendicularly to the flow direction, two electrodes which are disposed in the conduit and are connected to the inputs of a measuring amplifier, sample and hold circuits which are connected to the output of the measuring amplifier and controlled by a control means in such a manner that they sample the output voltage of the measuring amplifier for equal induction values of opposite sign and store the sampling values until the next sampling, a circuit for forming the difference of the stored sampling values and a storing control circuit which is disposed in a closed loop between the output and the input of the measuring amplifier and which in each compensation time interval is connected to the output of the measuring amplifier, forms a compensation voltage value regulating the output voltage of the measuring amplifier to the value zero and maintains said compensation voltage value until the next compensation time interval, is characterized according to the invention in that each sample and hold circuit includes an integrating RC member to which the signal voltage is applied via a switch closed for the duration of the associated sampling time intervals, and that there is connected in parallel with the resistor of each RC member a switch which is briefly closed at the start of each of the associated sampling time intervals.

Further features and advantages of the invention will be apparent from the following description of an example of embodiment with the aid of the drawings, wherein:

FIG. 1 shows the block diagram of an arrangement for carrying out the method.

FIG. 2 shows time diagrams of signals which occur at various points of the arrangement of FIG. 1, FIG. 3 shows further time diagrams of signals for explaining the mode of operation of the arrangements of FIGS. 1 and 4, FIG. 4 shows a modified embodiment of the arrangement of FIG. 1, FIG. 5 shows time diagrams for explaining the mode of operation of the arrangement of FIG. 4 in the presence of an interference AC voltage and FIG. 6 shows time diagrams for explaining a further modification of the method according to the invention.

DESCRIPTION OF THE PREFERRED EMBODIMENTS

Figure 1:
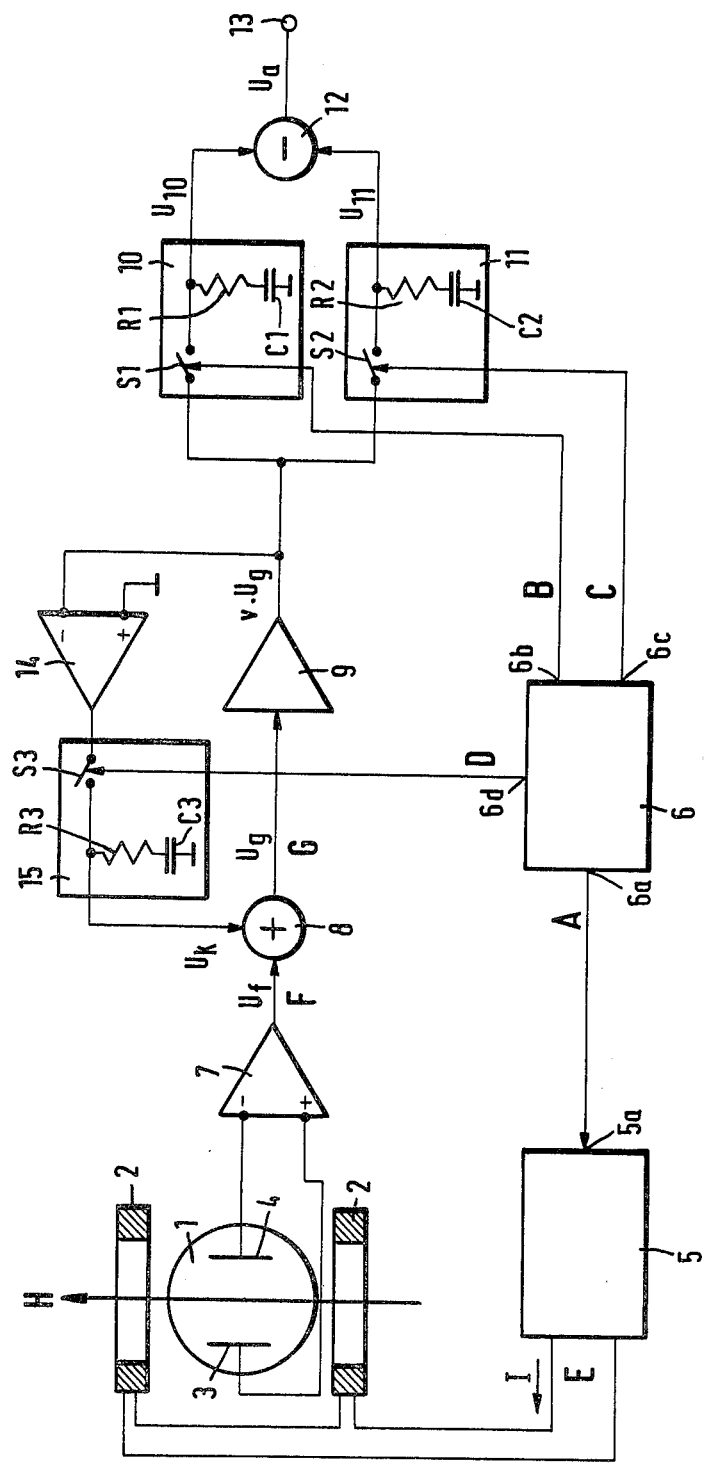

FIG. 1 shows diagrammatically an internally insulated tube 1 through which an electrically conductive fluid flows perpendicularly to the plane of the drawing. A magnetic field coil 2, which for reasons of symmetry is divided into equal halves disposed on either side of the tube 1, produces in the tube a magnetic field H directed perpendicularly to the tube axis. In the interior of the tube 1 two electrodes 3 and 4 are disposed from which an induced voltage can be tapped which is proportional to the mean flow rate of the electrically conductive fluid through the magnetic field. A coil control circuit 5 controls the current flowing through the magnetic field coil 2 in dependence upon a control signal which is furnished by the output 6a of a control circuit 6 and applied to the control input 5a.

The electrodes 3 and 4 are connected to the two inputs of a differential amplifier 7. The differential amplifier 7 has such a small gain that even with high interference voltages (in the typical case ±1 V) it cannot overshoot.

The output of the differential amplifier 7 is connected to an input of a summation circuit 8 to the output of which the input of an amplifier 9 having a gain v is connected.

Connected in parallel to the output of the amplifier 9 are two sample and hold circuits 10 and 11. For simplification it is indicated that the sample and hold circuit 10 comprises a switch S1 which is actuated by a control signal furnished by the output 6b of the control circuit 6. When the switch S1 is closed it connects a storage capacitor C1 lying in series with a resistor R1 to the output of the amplifier 9 so that the storage capacitor C1 is charged to a voltage which depends on the output voltage of the amplifier 9. The circuit elements R1, C1 form together an integrating member which integrates the output voltage of the amplifier 9 during the closing time of the switch S1. When the switch S1 is opened the sampling value stored on the capacitor C1 is available until the next closing of the switch S1 at the output of the sample and hold circuit 10. To prevent the capacitor C1 being able to discharge after opening of the switch S1 an impedance transformer may follow the output of the circuit 10 in the usual manner; for simplification said impedance transformer is not illustrated in the drawings.

In the same manner the sample and hold circuit 11 includes a switch S2 which is closed by a control signal furnished by the output 6c of the control circuit 6 and a storage capacitor C2 which together with a resistor R2 forms an integrating member which integrates the output voltage of the amplifier 9 during the closing time of the swithch S2. The charging voltage of the capacitor C2 reached after the opening of the switch S2 is available until the next closing of the switch S2 at the output of the sample and hold circuit 11 which can also be followed by an impedance transformer likewise not illustrated.

The outputs of the two sample and hold circuits 10, 11 are connected to the two inputs of a subtracting circuit 12 which furnishes at the output 13 a signal $U_a$ which corresponds to the difference between the sampling values stored in the sample and hold circuits 10, 11. The output signal $U_a$ forms the measured value signal which is a measure of the mean flow rate in the tube 1.

Also connected to the output of the amplifier 9 is the inverting input of an operational amplifier 14 whose non-inverting input, which serves as reference input, is applied to ground. Connected to the output of the operational amplifier 14 is a further sample and hold circuit 15 which contains a switch S3, a storage capacitor C3 and a resistor R3. The switch S3 is actuated by a control signal furnished by the output 6d of the control circuit 6. The output of the sample and hold circuit 15 is connected to the second input of the summation circuit 8.

Figure 2:
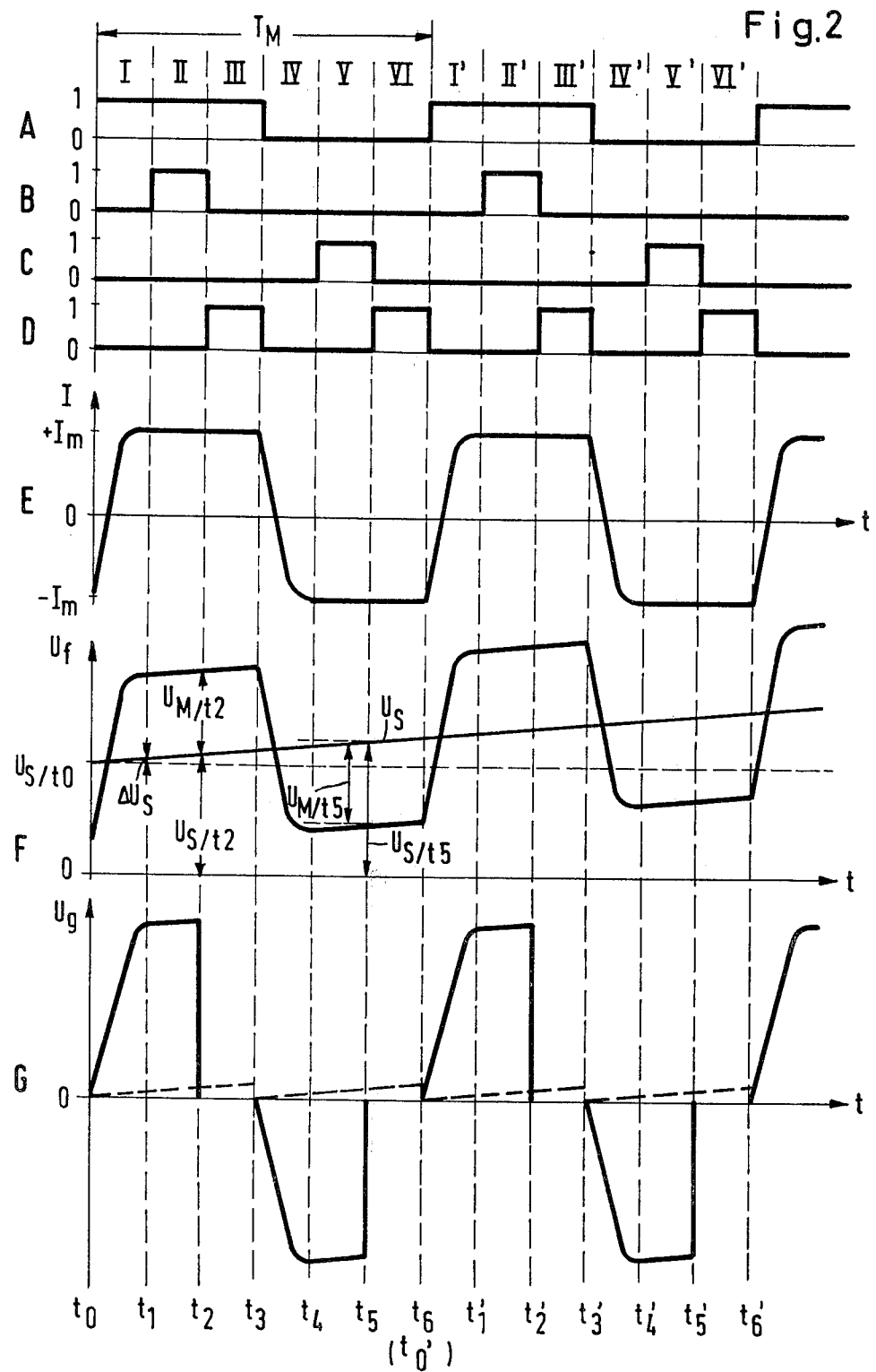

The diagrams A, B, C, D, E, F, G of FIG. 2 show the time variation of signals which occur at the circuit points of FIG. 1 indicated with the same letters.

In FIG. 2 the duration $T_M$ of a complete measuring cycle, which is equal to a period of the alternating magnetic field produced by the coil 2, is divided into six equal portions I, II, III, IV, V, VI which start at the instants $t_0$, $t_1$, $t_2$, $t_3$, $t_4$, $t_5$. The portion VI ends at the instant $t_6$ which coincides with the starting instant $t_0'$, of the next measuring cycle. In corresponding manner the portions of this next measuring cycle are designated by I', II', III', IV', V', VI' and their end instants by $t_1'$, $t_2'$, $t_3'$, $t_4'$, $t_5'$, $t_6'$.

The diagrams A, B, C, D show the control signals emitted by the control circuit 6 which assume either the signal value 1 or the signal value 0. With the control signals B, C, D applied to the switches S1, S2, S3 the signal value 1 signifies the closing of the switch, i.e. the sampling phase, and the signal value 0 the opening of the switch, i.e. the hold phase.

The control signal A supplied to the coil control circuit 5 has during the time periods I, II, III the signal value 1 and during the time periods IV, V, VI the signal value 0. The coil control circuit 5 is so constructed that for the signal value 1 of the control signal it sends a direct current of constant magnitude in the one direction and for the signal value 0 of the control signal a direct current of the same magnitude but opposite direction through the magnetic field coil 2. The coil control circuit 5 includes a current regulator which adjusts the current for any polarity to the same constant value $+I_m$ or $-I_m$. The variation of the current flowing through the magnetic field coil 2 is illustrated in diagram E. Due to the inductance of the magnetic field coil after each reversal the current reaches the constant value $I_m$ of opposite polarity only with a certain delay. In the diagram E it is assumed that with the reversal initiated at the instant $t_0$ from negative to the positive value the regulated positive value $+I_m$ is reached for the time period I so that for the entire duration of the time periods II and III the current value $+I_m$ exists. Correspondingly, with the reversal initiated at the instant $t_3$ from the positive to the negative value the constant negative value $-I_m$ is reached within the time period IV so that the current value $-I_m$ exists for the entire duration of the periods V and VI.

The magnetic field H exhibits the same variation with time as the current I.

The switch S1 of the sample and hold circuit 10 is closed by the control signal B in each measuring cycle for the duration of the period II. The sample and hold circuit 10 thus samples the output voltage of the amplifier 9 in the middle third of the positive partial period of the magnetic field H and stores the sampling value integrated over this period.

The switch S2 of the sample and hold circuit 11 is closed by the control signal C in each measuring cycle for the duration of the period V so that the sample and hold circuit 11 samples the output voltage of the amplifier 9 in the middle third of the negative partial period of the magnetic field H and stores the sampling value integrated over this period.

The switch S3 of the sample and hold circuit 15 is closed by the control signal D in each measuring cycle for the duration of the periods III and VI, i.e. immediately following the sampling time intervals defined by the closure of the switches S1 and S2. When the switch S3 is closed a closed-loop control circuit exists from the output of the amplifier 9 via the operational amplifier 14, the sample and hold circuit 15 and the summation circuit 8 to the input of the amplifier 9. This control circuit brings the voltage at the inverting input of the operational amplifier 14, i.e. the output voltage of the amplifier 9, to the reference potential at the non-inverting input, i.e. ground potential. Thus, the output of the sample and hold circuit 15 assumes in each compensation time interval defined by the closure of the switch S3, i.e. in each period III and VI of each measuring cycle, a compensation voltage $U_k$ which is oppositely equal to the signal voltage $U_f$ simultaneously applied to the other input of the summation circuit 8 and furnished by the output of the differential amplifier 7 so that the output voltage of the summation circuit 8 and thus also the output voltage of the amplifier 9 is rendered zero. After the opening of the switch S3, i.e. in the hold phase of the sample and hold circuit 15, the compensation voltage $U_k$ remains at the out-out of the sample and hold circuit 15 and said stored compensation voltage $U_k$ is added in the summation circuit 8 continuously to the particular signal voltage $U_f$ applied.

The diagram F shows the time variation of the signal voltage $U_f$ at the output of the differential amplifier 7. It includes a measuring voltage portion $U_M$ which depends on the flow rate in the tube 1 and the field strength of the magnetic field H. The measuring voltage $U_M$ is superimposed on an interference DC voltage $U_s$ which is due in particular to the different electrochemical equilibrium potentials. The interference DC voltage $U_S$ is not constant in time but increases and in the course of the measurement can reach values which may be a thousand times the measuring voltage $U_M$. To simplify the illustration and description it is assumed in the diagram F that the interference DC voltage $U_S$ at the instant $t_0$ has the value $U_{S/t0}$ and rises linearly; the increase of the interference DC voltage in each interval is designated by $\Delta U_S$.

Thus, for example, the signal voltage $U_f$ has at the instant $t_2$ the value:

$$U_{f/t2} = U_{S/t2} + U_{M/t2}$$

and at the instant $t_5$ the value:

$$U_{f/t5} = U_{S/t5} - U_{M/t5}.$$

The compensation voltage $U_k$ has in each compensation time interval, i.e. in the periods III and VI of each measuring cycle, the same magnitude as the signal voltage $U_f$ but the opposite sign and it retains the value which it has reached at the end of each compensation time interval, i.e. at the instants $t_3$ and $t_6$, until the start of the next compensation time interval.

The diagram G shows the voltage $U_g$ at the output of the summation circuit 8:

$$U_g = U_f + U_k.$$

The output voltage of the amplifier 9 differs from the voltage $U_g$ only by the gain v; it thus has the same time variation but the value $v \cdot U_g$.

Due to the compensation effect of the control loop outlined above the voltage $U_g$ in the period III has the value zero. At the instant $t_3$ the compensation voltage $U_k$ has reached the following value:

$$U_{k/t3} = -U_{f/t3} = -(U_{S/t3} + U_{M/t3})$$

At the instant $t_3$ the resersal of the magnetic field takes place so that the measuring voltage $U_M$ rapidly changes to the value corresponding to the negative magnetic field. On the other hand, the interference DC voltage $U_S$ is not influenced by the reversal of the magnetic field. The value $U_{S/t3}$ of the interference voltage reached at the instant $t_3$ is compensated to zero by the interference voltage portion $-U_{S/t3}$ contained in the stored compensation voltage $U_k$ during the periods IV and V. In the output voltage $U_g$ of the summation circuit 8 only the stored measuring voltage portion $-U_{M/t3}$ of the compensation voltage appears and now has the same sign as the measuring voltage portion $-U_M$ in the signal voltage $U_f$ and is added to the latter.

On this sum voltage the uncompensated part of the interference voltage is superimposed, i.e. an interference voltage portion which at the instant $t_3$ has the value zero and rises linearly from this value in the positive direction.

Thus, the voltage $U_g$ has at the instant $t_5$ the following value:

$$U_{g/t5} = U_{f/t5} + U_{k/t3}$$
$$= (U_{S/t5} - U_{M/t5}) - (U_{S/t3} + U_{M/t3})$$
$$= (U_{S/t5} - U_{M/t3}) - (U_{S/t3} + U_{M/t5})$$

The term $(U_{S/t5} - U_{S/t3})$ corresponds to the increase in the interference DC voltage during the periods IV and V, i.e. with the previously assumed linear rise has the value $2\Delta U_S$.

The term $(U_{M/t3} + U_{M/t5})$ is the sum of the measuring voltages at the instants $t_3$ and $t_5$. The output voltage $v \cdot U_g$ of the amplifier 9, which in the period V is sampled by the sample and hold circuit 11 for recovering the integrated sampling value $U_{11}$, thus contains the sum of two measuring voltage values, one of which was obtained and stored in the sample and hold circuit 15 in the period III during the previous positive partial period of the magnetic field H whilst the second measuring voltage value is contained in the signal voltage $U_f$ in the period V of the current negative partial period of the magnetic field.

If it is assumed that the flow rate in the tube 1 remains constant for the duration of the measuring cycle the two measuring voltage values $U_{M/t3}$ and $U_{M/t5}$ are of equal magnitude so that:

$$U_{M/t3} = U_{M/t5} = U_M.$$

The voltage $U_g$ at the instant $t_5$ is then $$U_{g/t5} = 2\Delta U_S - 2 U_M.$$

In the period VI the voltage $U_g$ is again brought to zero. At the instant $t_6$ the compensation voltage $U_k$ has assumed the following value:

$$U_{k/t6} = -U_{f/t6} = -(U_{S/t6} - U_{M/t6}).$$

For the voltage $U_g$ at the instant $t_{2'}$ the following relationship then applies:

$$U_{g/t2'} = U_{f/t2'} + U_{K/t6}$$
$$= U_{S/t2'} + U_{M/t2'} - (U_{S/t6} - U_{M/t6})$$
$$= (U_{S/t2'} - U_{S/t6}) + (U_{M/t6} + U_{M/t2'})$$

The corresponding amplified output voltage of the amplifier 9 is sampled in the period II' by the sample and hold circuit 10 to obtain the integrated sampling value $U_{10}$. It again contains two measuring voltage values, i.e. the value obtained and stored in the sample and hold circuit 15 in the period VI of the preceding measuring cycle and the value contained in the period II' in the signal voltage $U_f$.

Under the conditions defined above:

$$U_{g/t2'} = 2 U_S + 2 U_M.$$

If for simplification the integrated sampling values $U_{10}$ and $U_{11}$ stored in the sample and hold circuits 10 and 11 are made equal to the previously observed instantaneous values after amplification in the amplifier 9 the following relationship applies:

$$U_{10} = v(2\Delta U_S + 2 U_M)$$

$$U_{11} = v(2\Delta U_S - 2 U_M).$$

After forming the difference in the subtraction circuit 12 the output voltage obtained is $$U_a = U_{10} - U_{11} = v(2\Delta U_S + 2 U_M) - v(2\Delta U_S - 2 U_M)$$

$$U_a = v \cdot 4 \cdot U_M.$$

Thus, in the output voltage $U_a$ apart from the absolute interference DC voltage the interference voltage drift is also completely eliminated if it is assumed to be linear. The useful signal corresponds to four times the measuring voltage.

It is further apparent that the measuring voltages contained in the output signal have been obtained by integration in the four periods III, V, VI and II'. This corresponds to a signal observation over two thirds of the time, i.e. practically the entire time for which the magnetic field can be considered constant. Only the times of the magnetic field change due to the reversal are excluded from the signal observation.

It is further apparent that the absolute interference DC voltage is kept away from the amplifier 9 which apart from the measuring voltage need only process the relatively small interference voltage change between two compensation time intervals. The amplifier 9 may thus have a large gain without any danger of being overdriven.

The advantageous effects outlined are due to the fact that each compensation time interval lies completely within the period in which the magnetic field is switched on and has its constant value and in which also the previous sampling time interval lies. Due to this fact the stored compensation voltage contains apart from the interference DC voltage to be compensated also a measuring voltage portion which is utilized in the next sampling time interval to recover the useful signal. An advantage of this method is that for the compensation no magnetic field interruptions in which the magnetic field is zero are necessary for the compensation; it is thus particularly suitable in conjunction with a simple reversal of the magnetic field between two opposite values. The method is however not restricted to this case; it may readily also be used if magnetic field interruptions are provided for other reasons.

The division previously described of each half period into three equal periods of time, one of which forms the sampling time interval and another the compensation time interval, is of course only an example. Depending on the time variation of the magnetic field a different division may also be used. It is also not essential for the sampling time interval and the compensation time interval to follow each other without a gap. However, generally the aim will be to utilize the available time in which the magnetic field has its constant value as completely as possible for signal observation.

As apparent from the above description the switch S1 is closed in each case in the period II of each measuring cycle in which the current in the magnetic field coil 2 has the constant positive value $+I_m$. If it is assumed that the interference DC voltage does not change and also the flow rate remains constant, the voltage $U_g$ also has the same constant value in each period II. For the sample and hold circuit 10 the effect is as if a constant DC voltage sampled by the closing of the switch S1 is applied to the input. If the flow rate changes this has the effect for the sample and hold circuit 10 of a variation with time of the DC voltage apparently applied to the input.

The same applies to the sample and hold circuit 11 with the difference that the DC voltage apparently present and sampled in the period V of each measuring cycle by closing of the switch S2 has a different value.

Figure 3:
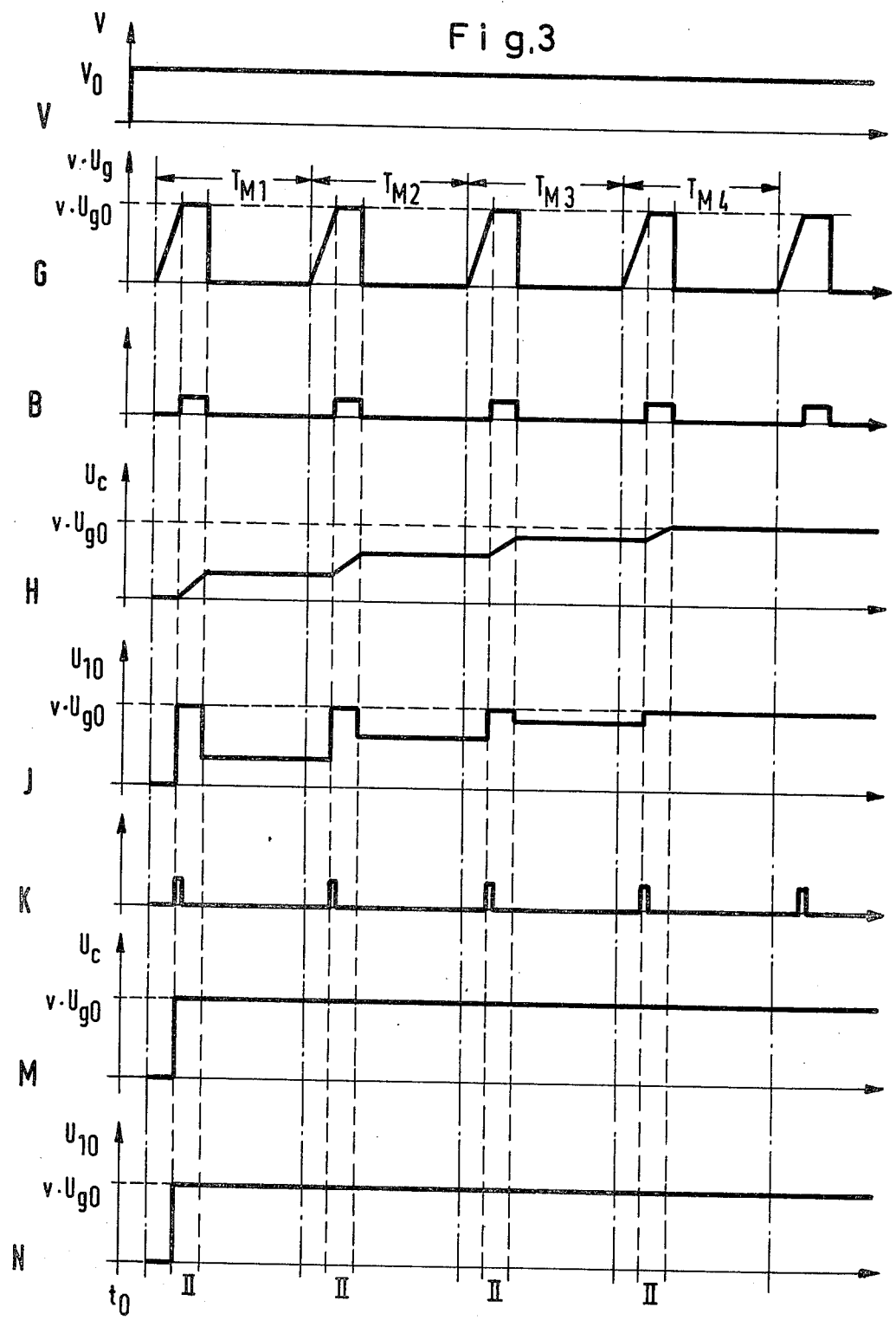

FIG. 3 shows how this situation affects the formation of the stored sampling values in the sample and hold circuit 10 with rapid flow changes.

The diagram V of FIG. 3 shows the flow velocity V in the tube 1. The case is shown where the flow is suddenly switched on at the instant $t_0$ so that the flow velocity V changes very rapidly from the value 0 to the constant value $V_0$.

The diagram G of FIG. 3 shows for the first four measuring cycles $T_{M1}$, $T_{M2}$, $T_{M3}$, $T_{M4}$ following the instant $t_0$, corresponding to the diagram G of FIG. 2, the output value $v \cdot U_g$ of the amplifier 9 which is also the input voltage of the sample and hold circuit 10. Only the positive voltage pulses are shown because only these are evaluated by the sample and hold circuit 10. Furthermore, the voltage $v \cdot U_g$ is shown for the simplified case in which the interference DC voltage does not change and the flow velocity in the tube 1 remains constant after reaching the value $V_0$. The positive voltage pulses of the voltage $v \cdot U_g$ thus reach in the successive measuring cycles in each case the same amplitude value $v \cdot U_{g0}$, which corresponds to the flow velocity $V_0$ and is constant for the entire duration of the sampling period II in each measuring cycle.

On the other hand, in the measuring cycles lying before the instant $t_0$ the voltage $v \cdot U_g$ always has the value 0.

The diagram B of FIG. 3 corresponds to the diagram B of FIG. 2. It shows the control signal B which is furnished by the output 6b of the control circuit 6 and closes the switch S1 for the duration of the period II in each measuring cycle $T_M$. The control signal B thus defines the sampling time intervals of the sample and hold circuit 10.

Since during each sampling time interval after the instant $t_0$ the same constant voltage is present at the input of the sample and hold circuit 10 the latter behaves as if its input voltage were a constant DC voltage $v \cdot U_{g0}$ which is equal to the amplitude value of the positive voltage pulses of the voltage $v \cdot U_g$ as indicated in the diagram G of FIG. 3 by a dashed line.

The diagram H of FIG. 3 shows the voltage $U_c$ at the terminals of the capacitor C1 in the sample and hold circuit 10. At the instant $t_0$ the voltage $U_c$ has the value zero.

On the first closure of the switch S1 in the period II of the measuring cycle $T_{M1}$ the voltage $U_c$ rises corresponding to the time constant of the RC member R1, C1 approximately linearly. In reality, the voltage rise is in known manner corresponding to an exponential function.

When the switch S1 is opened at the end of the period II of the measuring cycle $T_{M1}$ the voltage $U_c$ retains unchanged the last value reached until the switch S1 is again closed at the start of the period II in the next measuring cycle $T_{M2}$. The voltage $U_c$ then again rises but with a somewhat lesser slope corresponding to the next portion of the exponential function.

The same process is repeated in the following measuring cycles until finally the voltage $U_c$ has reached the full value of the DC voltage amplitude $v \cdot U_{g0}$. For simplification, it is assumed in FIG. 3 that this condition is already reached in the fourth measuring cycle $T_{M4}$. From this instant on the terminal voltage $U_c$ of the capacitor C1 no longer changes if the amplitude of the positive pulses of the voltage $v \cdot U_g$ remains unchanged.

The diagram J of FIG. 3 shows the output voltage $U_{10}$ of the sample and hold circuit 10. Each time the switch S1 is closed there is a direct connection between the input and output so that the input voltage appears unchanged at the output. This is because the resistor R1 is not in the longitudinal branch but in the transverse branch in series with the capacitor C1.

When the switch S1 is opened the full terminal voltage $U_c$ of the capacitor C1 is at the output of the sample and hold circuit. As already mentioned, a high-value impedance transformer, not illustrated, is connected after the output of the sample and hold circuit 10 in the usual manner and prevents the capacitor C1 discharging in the pauses between the sampling time intervals. Since therefore in the sampling pauses no current flows through the resistor R1 there is no voltage drop at said resistor and consequently the voltage stored in the capacitor C1 appears fully at the output and remains unchanged until the next sampling time interval.

The same mode of operation results also for the sample and hold circuit 11 with the negative voltage pulses of the voltage $v \cdot U_g$.

As the diagram J of FIG. 3 shows the output voltage of this sample and hold circuit follows a rapid change of the flow rate only with a considerable delay extending over several measuring cycles. Corresponding delays also of course arise when an already existing flow velocity is suddenly increased or reduced. The long rise and drop times due to the delay before reaching the stationary operating condition are in many uses very undesirable and even inadmissible, in particular in control and regulating operations in chemical process technology.

Figure 4:
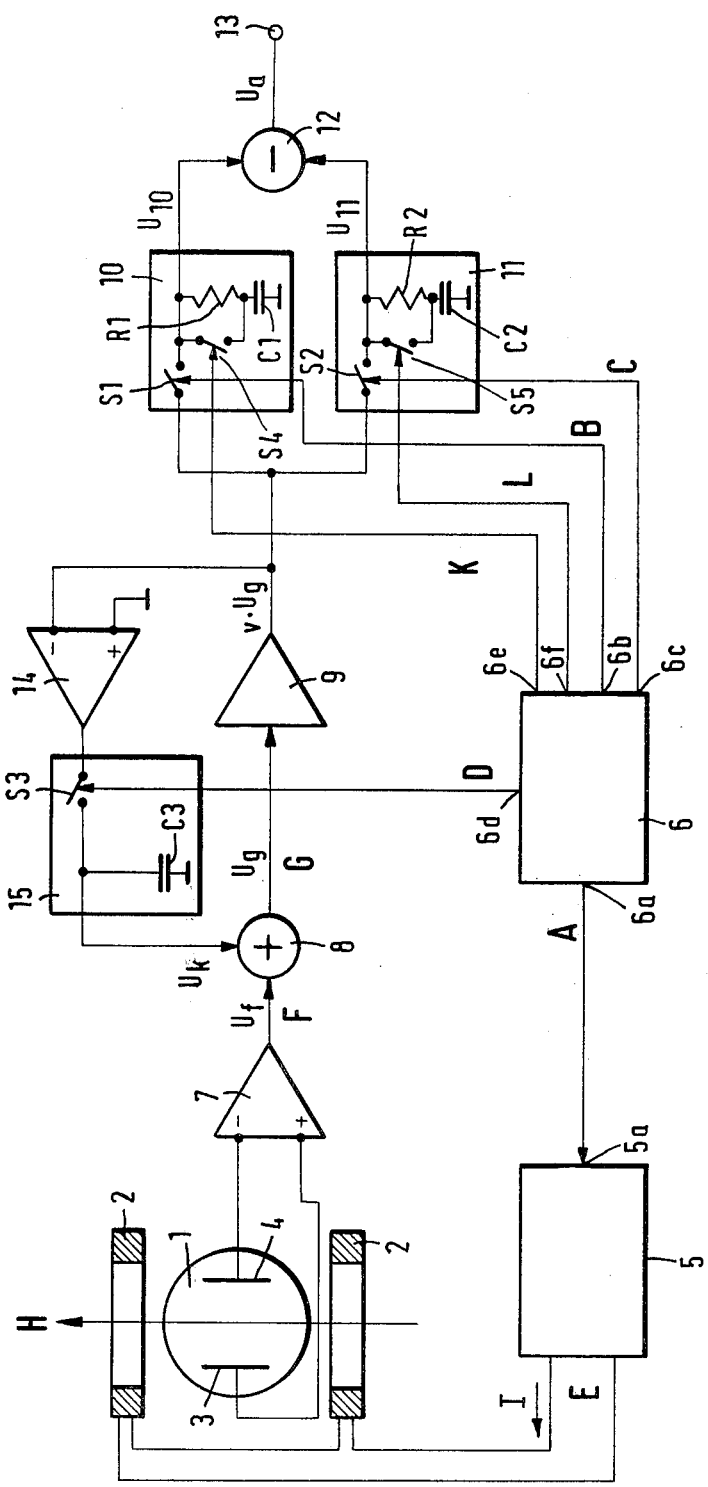

FIG. 4 shows a preferred embodiment of the arrangement of FIG. 1 in which the long rise time is eliminated.

The arrangement of FIG. 4 differs from that of FIG. 1 only in that in each sample and hold circuit 10, 11 a switch S4 and S5 respectively is connected in parallel with the resistor R1 and R2 respectively. The switch S4 is controlled by a control signal K which is furnished by the control circuit 6 at a further output 6e and the switch S5 is controlled by a control signal L which comes from an output 6f of the control circuit 6.

Furthermore, the resistor R3 in the sample and hold circuit 15 is omitted.

The remaining parts of the arrangement of FIG. 4 are unchanged compared with the arrangement of FIG. 1; they are designated by the same reference numerals as in FIG. 1.

The mode of operation of the arrangement of FIG. 4 will be described with the aid of the diagrams K, M and N of FIG. 3 for the sample and hold circuit 10.

The diagram K of FIG. 3 shows the control signal K which actuates the switch S4. It comprises short pulses which start simultaneously with the pulses of the control signal B but have a shorter duration than the latter. The switch S4 is thus closed simultaneously with the switch S1 but is reopened again shortly thereafter whilst the switch S1 remains closed.

By the closure of the switch S4 the resistor R1 is short-circuited so that the full input voltage is applied to the capacitor C1. The sample and hold circuit 10 operates in this condition as a genuine sample and hold which samples and stores the instantaneous value of an applied voltage.

The diagrams M and N of FIG. 3 show how this step affects the terminal voltage $U_c$ of the capacitor $C_1$ and the output voltage $U_{10}$ of the sample and hold circuit 10 when a rapid flow change takes place. When the switches S1 and S4 are closed at the start of the period II in the measuring cycle $T_{M1}$ the capacitor C1 immediately charges to the full input voltage. It retains this voltage after the opening of the switch S4 if the input voltage does not change during the remaining closure time of the switch S1.

As before, the output voltage $U_{10}$ during the closure time of the switch S1 is equal to the input voltage and after the opening of the switch S1 is equal to the capacitor voltage $U_c$. Since the capacitor voltage $U_c$, however, is equal to the full input voltage from the first measuring cycle onwards said voltage also remains after the opening of the switch S1 at the output of the sample and hold circuit 10. The stationary operating condition thus arises already in the first measuring cycle after the flow change. The circuit of FIG. 4 thus indicates rapid changes of the flow velocity with very little delay.

With the aid of the diagrams of FIG. 5 it will be explained how the superimposing of an interference AC voltage affects the sampling of the measuring voltage in the arrangement of FIG. 4. Such interference AC voltages are produced in particular by stray currents originating from the general AC mains. They thus have the mains frequency but any phase position.

Figure 5:
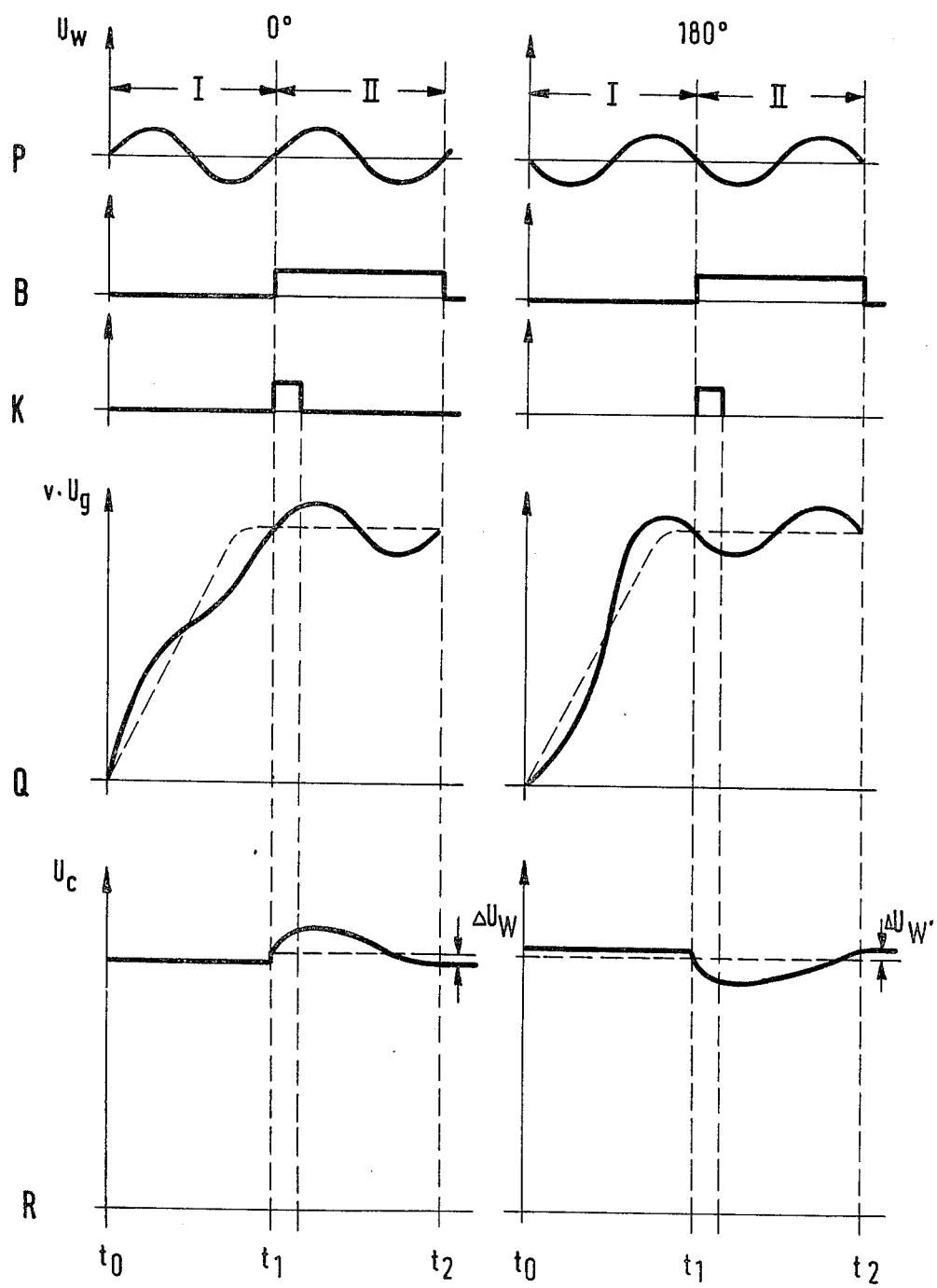

The diagram P of FIG. 5 shows such an interference AC voltage $U_w$ in the course of the two first time periods I and II of a measuring cycle for two different cases, that is in the left half of the diagram for the case where the interference AC voltage $U_w$ has a phase displacement of 0° with respect to the starting instant $t_0$ of the measuring cycle and in the right half for the case that the phase displacement is 180°. Of course, any other phase displacements are possible. As example, it is assumed that the duration of each time period is equal to the period of the interference AC voltage $U_w$, i.e. 20 ms for a 50 Hz network.

As in FIG. 3 the diagram B of FIG. 5 represents the control signal actuating the switch S1 and the diagram K the control signal actuating the switch S4.

The diagram Q shows the modification of the voltage $v \cdot U_g$ due to the superimposing of the interference AC voltage $U_w$ for both cases, and for simplification the linear change of the interference DC voltage has again been disregarded.

The diagram R shows the change of the terminal voltage $U_c$ of the capacitor C1 in the course of the sampling time interval which is defined by the closure time of the swtich S1 (time interval II).

On closure of the two switches S1 and S4 at the instant $t_1$ the capacitor voltage $U_c$ immediately changes to the instantaneous value of the input voltage $v \cdot U_g$, both in the first measuring cycle when the capacitor voltage was previously zero and in stationary operation when in the capacitor C1 a voltage of the preceding sampling operation is stored, as illustrated in FIG. 5.

During the closure time of the switch S4 (duration of the pulse K) the capacitor voltage $U_c$ follows without delay the input voltage $v \cdot U_g$. In this time interval a pure instantaneous value sampling takes place by the sample and hold principle.

On the other hand, after the opening of the switch S4 in the remaining closure time of the switch S1 the capacitor voltage $U_c$ follows the input voltage $v \cdot U_g$ only with a smoothing due to the RC member R1, C1 of the fluctuations caused by the superimposed interference AC voltage. The amplitude of the fluctuations is thereby substantially reduced.

The value reached of the capacitor voltage $U_c$ at the instant of the opening of the switch S1 remains stored in the capacitor C1 until the next sampling operation and is available at the output of the sample and hold circuit 10 as output voltage $U_{10}$. This stored capacitor voltage includes apart from the sampled measuring voltage an interference AC voltage remainder $\Delta U_w$ which depends not only on the amplitude of the interference AC voltage but also on its phase relation with respect to the sampling time interval. The two curves of diagram R shows that under otherwise equal conditions the interference AC voltage remainders $\Delta U_w$ are different for the two assumed phase relations of 0° and 180°.

However, due to the smoothing effected by the RC member even in the most unfavourable case the interference AC voltage remainder $\Delta U_w$ is substantially smaller than the amplitude of the superimposed interference AC voltage.

The interference AC voltage remainder does not impair the measuring accuracy if it is insured that in the sampling of the negative voltage pulses as well in the sample and hold circuit 11 an interference AC voltage remainder of the same magnitude with the same sign is obtained. The interference AC voltage remainders then cancel themselves out when the difference is formed in the subtraction circuit 12.

This condition is obviously fulfilled when the sampling time intervals (closure times of the switches S1, S4 and of the switches S2, S5) in the two sample and hold circuits 10 and 11 are of the same magnitude and when the interference AC voltage has the same phase relation with respect to these sampling time intervals.

The difference formation also removes interference AC voltage portions which are contained in the compensation voltage which is formed and stored in the sample and hold circuit 15 (FIGS. 1 and 4) of the compensation circuit if it is again ensured that the interference AC voltage components occur in the successive compensation time intervals with the same magnitude and with the same sign. This condition is fulfilled if the successive compensation time intervals (closure times of the switch S3) are of the same duration and have the same phase relation with respect to the interference AC voltage. Furthermore, as before of course the time intervals between each compensation time interval and the next sampling time interval must be of the same magnitude. On the other hand, it is not necessary for the duration of the compensation time intervals to be equal to the duration of the sampling time intervals.

The sample and hold circuit 15 in the compensation circuit (FIGS. 1 and 4) can be made basically in the same manner as the sample and hold circuit 10 and 11; thus, in the case of FIG. 4 they could also be equipped with an additional switch which bridges the resistor R3 in the first part of each compensation time interval. However, it is simpler to omit the resistor R3 entirely, as illustrated in FIG. 4, so that the sample and hold circuit 15 acts as pure instantaneous value storage (sample and hold) for the entire compensation time interval. This embodiment is particularly suitable for the case where the compensation time interval is very short as will be explained hereinafter with the aid of FIG. 6.

To obtain the same phase relation it suffices to bring the start of each sampling time interval and each compensation time interval into a predetermined phase relationship to the mains AC voltage, for example to initiate the sampling operation in each case on a zero passage of the mains AC voltage. Admittedly, the phase of the interference AC voltage produced by stray currents may be in any relationship to the mains AC voltage and is not predictable; it may however be assumed that this phase relation remains constant for relatively long periods of time.

On the other hand, because of the unpredictable phase relation of the interference AC voltage it is not possible to remove with certainty the interference AC voltage remainder by a certain dimensioning of the duration of the sampling operations. Even if the sampling time interval is made equal to the period of the interference AC voltage or equal to a multiple thereof, with unfavourable phase relation the interference AC voltage remainder can reach its maximum.

The previously outlined removal of the interference AC voltage remainder by the difference formation thus gives complete freedom in the choice of the sampling times provided the previously indicated conditions of equal duration and equal phase relation with respect to the AC mains voltage are observed.

Figure 6:
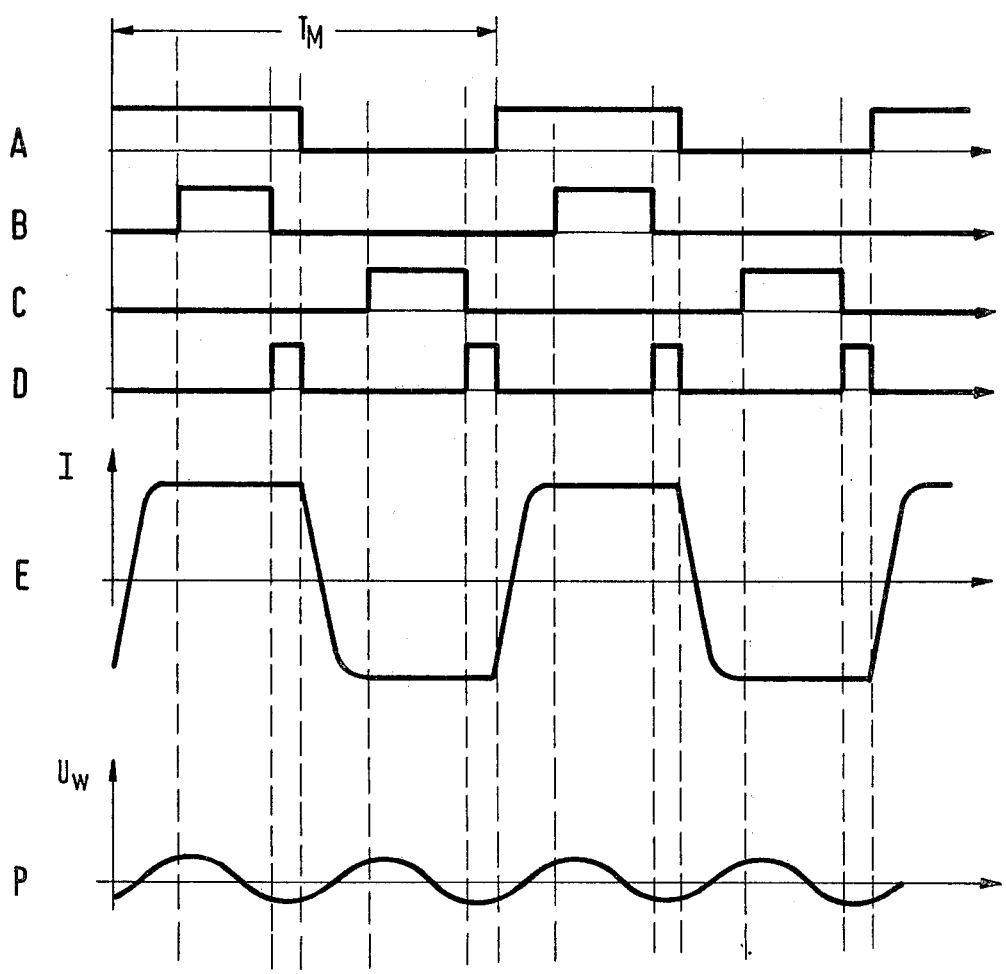

As example, in FIG. 6 in a manner corresponding to FIG. 2 the signal diagrams are illustrated for an example of embodiment in which the frequency of the field reversal in the magnetic field coil 2 is equal to half the frequency of the interference AC voltage so that in each case one sampling time interval and one compensation time interval lie in a period of the interference AC voltage.

Like the corresponding diagrams of FIG. 2 the diagrams A, B, C, D, E of FIG. 6 show the various control signals furnished by the control circuit 6 and the time variation of the coil current I.

The diagram P represents, as in FIG. 5 the interference AC voltage $U_w$ with a random phase relation.

To indicate the versatile possibilities of the steps described the sampling time intervals (diagrams B and C) are furthermore substantially longer than the compensation time intervals (diagram D). As a result the greatest possible time is utilized for the signal sampling.

However, the following conditions are observed:
1. The duration of the sampling time intervals in the sample and hold circuit 10 (diagram B) is equal to the duration of the sampling time intervals in the sample and hold circuit 11 (diagram C).
2. All the sampling time intervals (diagrams B and C) have the same phase relation with respect to the AC interference voltage (diagram P).
3. All the compensation time intervals (diagram D) have the same duration.
4. All the compensation time intervals have the same phase relation with respect to tthe interference voltage.
5. The time intervals between each compensation time interval and the next sampling time intervals are of equal magnitude.

On the other hand, there is no definite relationship between the duration of the sampling time intervals or the compensation time intervals in the period of the interference AC voltage.

The control signals for actuating the switches S4 and S5 have been omitted in FIG. 6 for simplification; they lie of course again in each case in the initial part of the control signals B and C respectively.

What I claim is:

1. A method of compensating interference voltages occuring in the electrode circuit of an inductive flow measurement circuit where a periodically reversed DC magnetic field is applied to a flowing electrically conductive liquid and at least two electrodes are disposed in the liquid from which an alternating signal voltage is obtained, sampling said signal voltage during first and second sampling intervals respectively occurring during successive, opposite polarities of the signal voltage, storing each sample value obtained during the first sampling interval in a first integrating storage member, storing each sample value obtained during the second sampling interval in a second integrating storage member and forming the difference of the sample values stored in the integrating storage members, said method comprising the steps of:
   sampling the full instantaneous value of the signal voltage during a brief interval occurring at the beginning of each sampling interval and storing the sampled instantaneous value in its associated integrating storage member; and
   integrating the signal voltage by means of the associated integrating storage member during the remainder of each sampling interval subsequent to said brief interval.

2. A method as defined in claim 1, wherein each integrating storage member comprises a resistor and a capacitor, comprising the steps of:
   directly charging the capacitor of the associated integrating storage member to the full instantaneous value of the signal voltage during said brief interval at the beginning of each sampling interval; and
   applying the signal voltage to the capacitor via the resistor during said remainder of each sampling interval.

3. A method as defined in claim 1 wherein all sampling intervals have the same duration and the start of each sampling interval is in a fixed phase relationship to an interference AC voltage which phase relationship is the same for all the sampling intervals.

4. A method as defined in claim 1 wherein the duration of each sampling interval is different from the period or a multiple of the period of an interference AC voltage.

5. Apparatus for effecting inductive flow measurement of an electrically conductive liquid flowing in a conduit, comprising:
   a magnetic field generator for generating a periodically reversed magnetic field passing through the conduit perpendicularly to the flow direction;
   a measuring amplifier;
   two electrodes disposed in the conduit for applying to the measuring amplifier an alternating signal voltage;
   first and second integrating storage members, each comprising a resistor and a capacitor;
   first switching means connected between the output of said measuring amplifier and said first integrating storage member;
   second switching means connected between the output of said measuring amplifier and said second integrating storage member;

third switching means connected in parallel to the resistor of said first integrating storage member;

fourth switching means connected in parallel to the resistor of said second integrating storage member;

control means controlling said first and third switching means to connect said first integrating storage member to the output of said measuring amplifier during a first sampling interval occurring during each first polarity of the signal voltage and to short circuit the resistor of said first integrating storage member for a first brief interval occurring at the beginning of each said first sampling interval to thereby charge the capacitor of the first integrating storage member to the full instantaneous value of the signal voltage occurring during the first brief interval, said control means further controlling said second and fourth switching means to connect said second integrating storage member to the output of said measuring amplifier during a second sampling interval occurring during each second polarity of the signal voltage and to short circuit the resistor of said second integrating storage member for a second brief interval occurring at the beginning of each said second sampling interval to thereby charge the capacitor of the second integrating storage member to the full instantaneous value of the signal voltage occurring during the second brief interval; and circuit means connected to the outputs of said first and second integrating storage members for forming the difference of the stored sample values.

6. Apparatus as in claim 5 where said control means, during the remainders of said first and second sampling intervals subsequent to said brief intervals, respectively connects the output of the measuring amplifier to (a) said capacitor of the first integrating storage member via its associated resistor during the remainder of the first sampling interval subsequent to the first brief interval, and (b) said capacitor of the second integrating storage member via its associated resistor during the remainder of the second sampling period subsequent to the second brief interval.

* * * * *